(12) United States Patent
Wangard et al.

(10) Patent No.: US 10,148,368 B1
(45) Date of Patent: Dec. 4, 2018

(54) SYSTEM AND METHOD FOR OVER THE AIR ANALYZING

(71) Applicant: Rohde & Schwarz GmbH & Co. KG, Munich (DE)

(72) Inventors: Bill Wangard, Kildeer, IL (US); Darren McCarthy, Sherwood, OR (US); William Kardine, Sterling, VA (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/607,988

(22) Filed: May 30, 2017

(51) Int. Cl.
*H04B 17/00* (2015.01)
*H04B 17/309* (2015.01)
*H04B 17/318* (2015.01)
*H04W 24/08* (2009.01)
*H04W 28/04* (2009.01)

(52) U.S. Cl.
CPC ......... *H04B 17/309* (2015.01); *H04B 17/318* (2015.01); *H04W 24/08* (2013.01); *H04W 28/04* (2013.01)

(58) Field of Classification Search
CPC .... H04B 17/309; H04B 17/318; H04W 24/08
See application file for complete search history.

(56) References Cited

U.S. PATENT DOCUMENTS

| 6,144,692 | A | 11/2000 | Beck | |
| 8,976,889 | B2* | 3/2015 | Wu | H04B 17/0085 370/252 |
| 2011/0129023 | A1* | 6/2011 | Hoffmann | H04L 27/2613 375/260 |
| 2016/0020813 | A1* | 1/2016 | Pilat | G07C 9/00857 455/66.1 |
| 2016/0343548 | A1* | 11/2016 | Howald | G01R 27/02 |

* cited by examiner

*Primary Examiner* — Tuan Pham
(74) *Attorney, Agent, or Firm* — Potomac Technology Law, LLC

(57) ABSTRACT

A system for over the air analyzing is provided. The system comprises an analyzing unit, an antenna, and a load switch. The load switch is used for connecting a reference load. In addition to this, the load switch is integrated in the antenna, or a first signal path between the antenna and the load switch is shorter than a second signal path between the load switch and the analyzing unit.

14 Claims, 3 Drawing Sheets

SYSTEM AND METHOD FOR OVER THE AIR ANALYZING

TECHNICAL FIELD

The invention relates to a system and a method for over the air analyzing, more specifically, a system and a method for over the air analyzing with the aid of a load switch and a reference load connectable thereto.

BACKGROUND

Generally, in times of an increasing number of applications employing wireless technologies, there is a growing need of a system and a method for over the air analyzing in a most efficient and accurate manner in order to allow for a highly performant and low-cost test equipment for testing the correct functionality of said applications.

U.S. Pat. No. 6,144,692 relates to over the air analyzing in the context of testing antennas. Disadvantageously, a spectrum analyzer is connected to an antenna via a receiver and a demodulator without using any reference load, which makes the respective measurements and tests because of a generally existing noise floor caused by each component, which is not reduced due to the lacking reference load.

Accordingly, there is a need for a system and a method for over the air analyzing in a more efficient and accurate manner, such as with the aid of a load switch and a reference load connectable thereto.

SOME EXAMPLE EMBODIMENTS

Embodiments of the present invention advantageously address the foregoing requirements and needs, as well as others, by providing a system and a method for over the air analyzing in a more efficient and accurate manner, such as with the aid of a load switch and a reference load connectable thereto.

According to a first aspect of the invention, a system for over the air analyzing is provided. The system comprises an analyzing unit, an antenna, and a load switch. The load switch is used for connecting a reference load. In addition to this, the load switch is integrated in the antenna, or a first signal path between the antenna and the load switch is shorter than a second signal path between the load switch and the analyzing unit. Advantageously, not only a noise floor caused by the analyzing unit, but a noise floor of the entire system can be reduced.

According to an example implementation form of the first aspect, the load switch is controllable by the analyzing unit. Advantageously, the reference load can be connected, if required.

According to a further example implementation form of the first aspect, the first signal path comprises at least one first auxiliary measurement device.

According to a further example implementation form of the first aspect, the at least one first auxiliary measurement device comprises cabling or a filter or an amplifier or any combination thereof. Advantageously, not only noise associated with the antenna and the analyzing unit can be measured and subtracted in order to minimize a noise floor of the system, but also noise associated with cabling, filtering, and amplifying.

According to a further example implementation form of the first aspect, the second signal path comprises at least one second auxiliary measurement device.

According to a further example implementation form of the first aspect, the at least one second auxiliary measurement device comprises cabling or a filter or an amplifier or a load, especially a resistive load, or any combination thereof. Advantageously, not only noise associated with the antenna and the analyzing unit can be measured and subtracted in order to minimize a noise floor of the system, but also noise associated with cabling, filtering, amplifying, and a load, especially a resistive load.

According to a further example implementation form of the first aspect, the analyzing unit comprises a noise reduction unit for reducing noise of the signal to be analyzed. Advantageously, noise of the signal to be measured is especially reduced by subtracting a measured noise floor of the system.

According to a further example implementation form of the first aspect, the noise reduction unit derives noise reduction values from a first measured spectrum of the signal to be analyzed, if the reference load is connected, and from a second measured spectrum of the signal to be analyzed, if the reference load is disconnected.

According to a further example implementation form of the first aspect, the analyzing unit is a spectrum analyzing unit which analyzes a signal to be analyzed with respect to its spectrum with the aid of the reference load being connected or without the reference load in the case that the reference load is disconnected.

According to a second aspect of the invention, a method for over the air analyzing is provided. The method comprises the steps of using a load switch for connecting a reference load, integrating the load switch into an antenna or connecting the load switch to the antenna in such a manner that a first signal path between the antenna and the load switch is shorter than a second signal path between the load switch and an analyzing unit, and analyzing a signal to be analyzed with the aid of the analyzing unit. Advantageously, not only a noise floor caused by the analyzing unit, but a noise floor of the entire system can be reduced.

According to an example implementation form of the second aspect, the method further comprises the step of controlling the load switch with the aid of the analyzing unit. Advantageously, the reference load can be connected, if required.

According to a further example implementation form of the second aspect, the first signal path comprises at least one first auxiliary measurement device.

According to a further example implementation form of the second aspect, the at least one first auxiliary measurement device comprises cabling or a filter or an amplifier or a load, especially a resistive load, or any combination thereof. Advantageously, not only noise associated with the antenna and the analyzing unit can be measured and subtracted in order to minimize a noise floor, but also noise associated with cabling, filtering, amplifying, and a load, especially a resistive load.

According to a further example implementation form of the second aspect, the second signal path comprises at least one second auxiliary measurement device.

According to a further example implementation form of the second aspect, the at least one second auxiliary measurement device comprises cabling or a filter or an amplifier or a load, especially a resistive load, or any combination thereof. Advantageously, not only noise associated with the antenna and the analyzing unit can be measured and subtracted in order to minimize a noise floor, but also noise associated with cabling, filtering, amplifying, and a load, especially a resistive load.

According to a further example implementation form of the second aspect, the method further comprises the step of reducing noise of the signal to be analyzed with the aid of a noise reduction unit comprised by the analyzing unit. Advantageously, noise of the signal to be measured is especially reduced by subtracting a measured noise floor.

According to a further example implementation form of the second aspect, the method further comprises the step of deriving noise reduction values with the aid of the noise reduction unit from a first measured spectrum of the signal to be analyzed, if the reference load is connected, and from a second measured spectrum of the signal to be analyzed, if the reference load is disconnected.

According to a further example implementation form of the second aspect, the signal to be analyzed is analyzed with respect to its spectrum with the aid of the analyzing unit, if the reference load is connected, or without the reference load in the case that the reference load is disconnected.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

A system and a method for over the air analyzing in a more efficient and accurate manner, such as with the aid of a load switch and a reference load connectable thereto, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Figure 1:
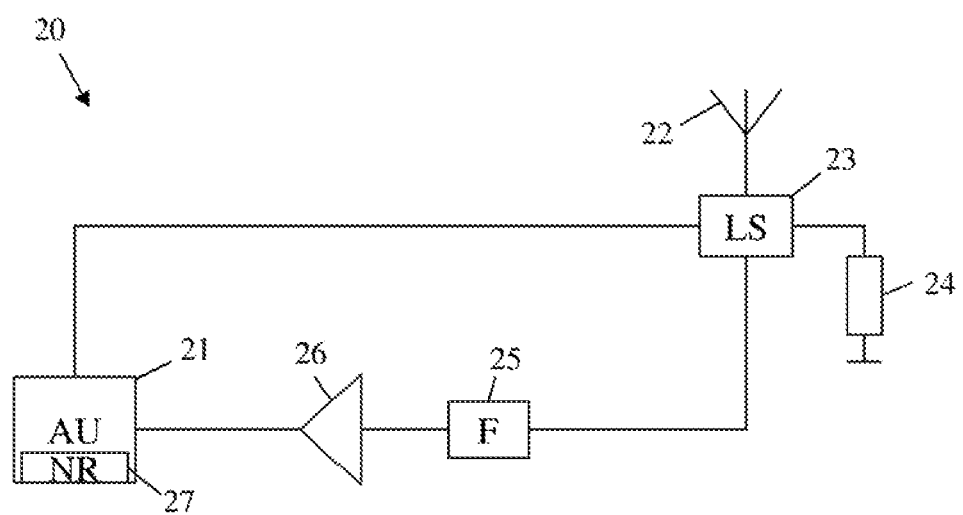
FIG. 1 shows a block diagram of an example system for over the air analyzing, in accordance with example embodiments of the present invention.

FIG. 1 illustrates an example embodiment of a system 20 for over the air analyzing, in accordance with example embodiments of the present invention. The system 20 comprises an analyzing unit 21, an antenna 22, a load switch 23 connected to a reference load 24, a filtering unit 25, and an amplifier especially in the form of a preamplifier 26.

By way of example, with the aid of the direction of the amplifier 26, the analyzing unit 21 generally analyzes a signal received with the aid of the antenna 22. In this context, transmitting a signal generated by the analyzing unit 21 with the aid of the antenna 22 would be also possible.

As depicted in the example system of FIG. 1, the signal to be analyzed, with the aid of the analyzing unit 21, is received with the aid of the antenna 22. Afterwards, the received signal to be analyzed is passed the load switch 23. The load switch 23 is connected to the antenna 22 in such a manner that the signal path between the load switch 23 and the antenna 22 is as short as possible. Alternatively, the load switch 23 may be integrated in the antenna 22.

Further, the load switch 23 passes the signal to be analyzed via at least one auxiliary measurement device such as filters, which are illustrated in the form of the filtering unit 25, or amplifiers, which are illustrated in the form of the preamplifier 26, or cabling, or any combination thereof.

In addition to this, the load switch 23 is also connected to the analyzing unit 21 in such a manner that the load switch 23 is controllable by the analyzing unit 21 via said connection.

Moreover, with respect to the above-mentioned reference load 24 connected to the load switch 23, the load switch 23 may be a complex impedance or a purely ohmic resistance. The value of the impedance or the resistance may be between 20 and 80 ohm, such as 50 ohm.

Further, as depicted in the example system of FIG. 1 the analyzing unit 21 comprises a noise reduction unit 27 for reducing noise of the signal to be analyzed. According to example embodiments, the noise reduction unit may comprises a processor or other electronic circuitry that is configured to reduce the noise of the signal to be analyzed. In this context, the noise reduction unit 27 derives noise reduction values from a first measured spectrum of the signal to be analyzed, if the reference load 24 is connected, and from a second measured spectrum of the signal to be analyzed, if the reference load 24 is disconnected.

Accordingly, a first and a second spectrum may be measured with the aid of the analyzing unit 21. According to example embodiments, the analyzing unit 21 may comprise is a spectrum analyzer or a processor configured to analyze signals, where the analyzing unit is configured to analyze the signal to be analyzed with respect to its spectrum with the aid of the reference load 24 being connected or without the reference load 24 in the case that the reference load 24 is disconnected.

Figure 2:
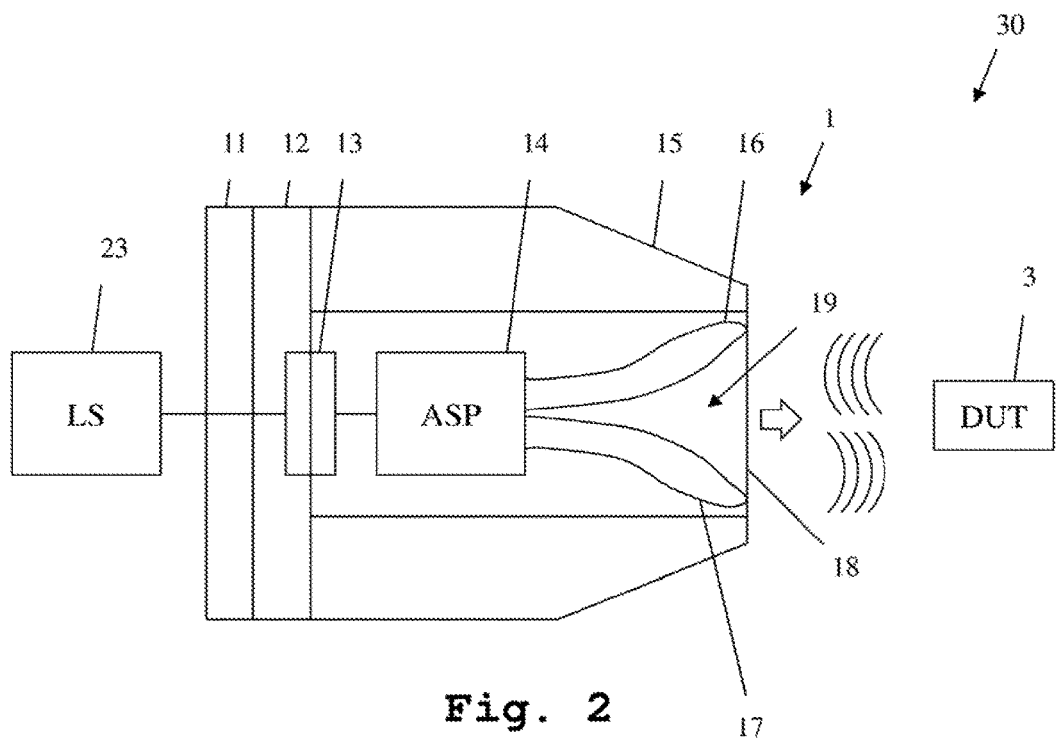
FIG. 2 shows an example over the air measurement module, in the form of an antenna shown in a top-down view, in accordance with example embodiments of the present invention.

FIG. 2 shows an example over the air measurement module, in the form of an antenna shown in a top-down view, in accordance with example embodiments of the present invention.

According to such example embodiments, the over the air measurement module 1 comprises a housing 15 which contains a substrate 18, such as a printed circuit board. On the substrate 18, two antenna elements 16, 17 forming a tapered slot line antenna 19, are arranged. The antenna 19 is connected to an analog signal processor 14 which is also arranged on the substrate 18. The analog signal processor is connected to a connector 13 which serves as an interface 13. Connectable to the interface 13 is the load switch 23, which is not part of the over the air measurement module 1. The antenna 19 has a main radiation direction towards the right edge of the substrate 18, indicated by an arrow in the figures. A device under test 3 is suitably arranged in this direction.

By way of example, in order to minimize reflections from the over the air measurement module 1, the housing 15 is tapered towards the main radiation direction of the antenna 19. This tapering reduces the effective surface area, which can produce reflections. In order to further reduce such reflections, the housing 15 can be fabricated from an electromagnetic radiation absorbing material. It can also be covered with such a material or can be coated with an absorptive paint. The housing 15 further comprises a back plate 11, which is covered with absorptive material 12 in order to further reduce reflections.

In this context, even though the example embodiment of the over the air measurement module 1 according to FIG. 2 provides a main radiation direction, the embodiments of the invention may further relate to employing an antenna providing omnidirectional radiation characteristics.

By way of further example, the over the air measurement module 1 may be suitable for two types of measurements. In a first type of measurement, a first measuring signal emitted from the device under test 3 is received by the antenna 19 and handed to the analog signal processor 14. The analog signal processor 14 reduces the frequency of the first measuring signal resulting in a frequency reduced first measuring signal. This is for example done by down-converting the first measuring signal using a mixer. Additionally, the analog signal processor in this case can comprise one or more filters for filtering the first measuring signal or the frequency reduced first measuring signal, a power sensor, which can be used for directly measuring a power of the frequency reduced first measuring signal, an amplifier for amplifying the first measuring signal or the first frequency reduced measuring signal, and a radio frequency switch for switching between the previously described measuring option and the measuring option described in the following. The processed frequency reduced measuring signal is then handed on to the connector 13, which passes on the signal to for example the external load switch 23 passing directly or indirectly on the said signal to the analyzing unit 21 for further processing the frequency reduced measuring signal. In this context, whereas "directly passing the signal" means passing the signal without auxiliary measurement devices in the respective signal path, "indirectly passing the signal" means passing the signal with the aid of at least one auxiliary measurement device such as filters or amplifiers in the respective signal path.

Alternatively, the over the air measurement module can be used for another type of measurement. In this case, the connector 13 directly or indirectly receives a frequency reduced second measuring signal from the analyzing unit 21 via the load switch 23. In this context, whereas "directly receiving the signal" means receiving the signal without auxiliary measurement devices in the respective signal path, "indirectly receiving the signal" means receiving the signal with the aid of at least one auxiliary measurement device such as filters or amplifiers in the respective signal path. Afterwards, said signal is handed on to the analog signal processor 14. The analog signal processor 14 increases the frequency of the frequency reduced second measuring signal resulting in a second measuring signal. This is for example done by mixing the frequency reduced second measuring signal with a further local oscillator signal. The second measuring signal is then transmitted by the antenna 19 to the device under test 3. Also, in this case, the analog signal processor can comprise additional components. The analog signal processor can comprise a filter, for filtering the second measuring signal and/or the second frequency reduced measuring signal. Also, the analog signal processor can comprise an amplifier for amplifying the second measuring signal and/or the second frequency reduced measuring signal. Moreover, the analog signal processor can comprise a radio frequency switch, adapted to switch between different operating modes of the over the air measurement module.

Figure 3:
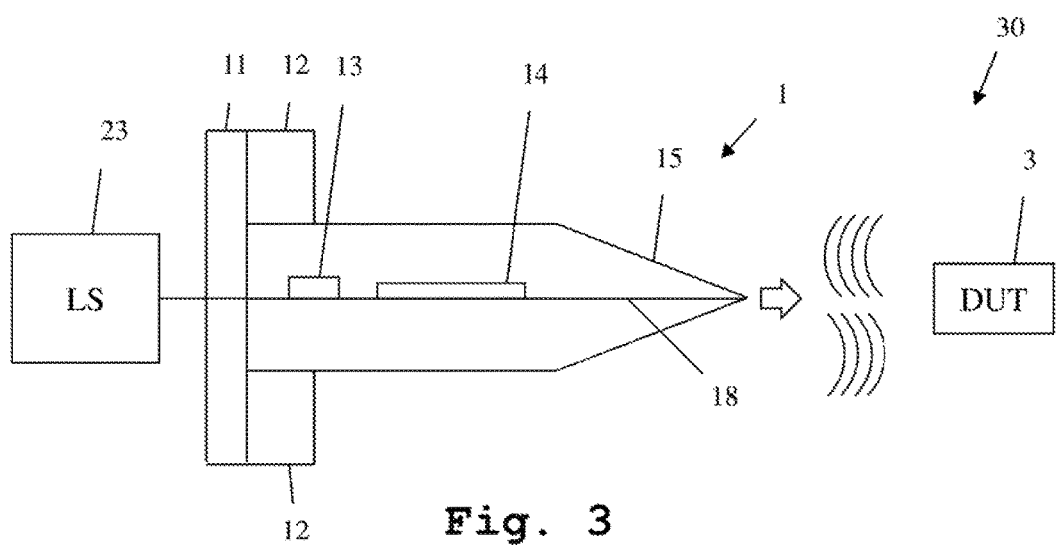
FIG. 3 shows a side view of the antenna of FIG. 2.

In FIG. 3, the over the air measurement module of FIG. 2 is shown in a cut view from the side. Here it can be seen that the analog signal processor 14 and the connector 13 are arranged on the substrate 18. Moreover, the tapering of the housing 15 and the arrangement of the absorbers 12 can be seen.

Figure 4:
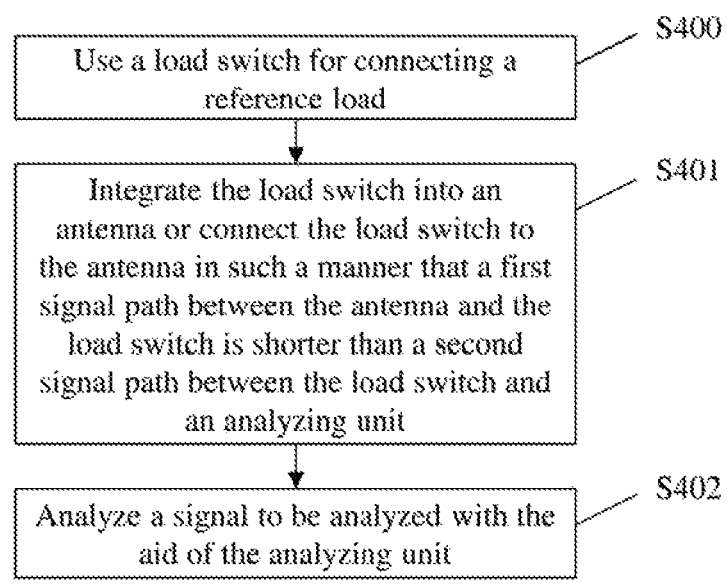
FIG. 4 shows a flow chart of an example method for over the air analyzing, in accordance with example embodiments of the present invention.

FIG. 4 shows a flow chart of an example method for over the air analyzing, in accordance with example embodiments of the present invention. In a first step S400, a load switch is used for connecting a reference load. In a second step S401, the load switch is integrated into an antenna or the load switch is connected to the antenna in such a manner that a first signal path between the antenna and the load switch is shorter than a second signal path between the load switch and an analyzing unit. Then, in a third step, a signal to be analyzed is analyzed with the aid of the analyzing unit.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for over the air analyzing, the system comprising:
   a signal analyzer;
   an antenna;
   a reference load; and
   a load switch configured to connect the reference load to the signal analyzer; and
   wherein the load switch is either integrated in the antenna, or the load switch is connected to the antenna via a first signal path and to the signal analyzer via a second signal path, wherein the first signal path is shorter than the second signal path,
   wherein the signal analyzer comprises a noise reduction device configured to reduce noise of a signal to be analyzed, and
   wherein the noise reduction device is configured to derive noise reduction values from a first measured spectrum of the signal to be analyzed when the reference load is connected, and from a second measured spectrum of the signal to be analyzed when the reference load is not connected.

2. The system according to claim 1, wherein the signal analyzer is configured to control the load switch.

3. The system according to claim 1, wherein the first signal path comprises at least one first auxiliary measurement device.

4. The system according to claim 3, wherein the at least one first auxiliary measurement device comprises one or more of cabling, one or more filters, and one or more amplifiers.

5. The system according to claim 1, wherein the second signal path comprises at least one second auxiliary measurement device.

6. The system according to claim 5, wherein the at least one second auxiliary measurement device comprises one or more of cabling, one or more filters, and one or more amplifiers.

7. The system according to claim 1, wherein the signal analyzer comprises a spectrum analyzer configured to analyze a signal to be analyzed, with respect to spectrum of the signal to be analyzed, wherein the reference load either is connected or is disconnected.

8. A method for over the air analyzing, the method comprising:
 analyzing a signal to be analyzed with the aid of a signal analyzer;
 reducing noise of the signal to be analyzed with the aid of a noise reduction device within the signal analyzer; and
 deriving noise reduction values, via the noise reduction device, from a first measured spectrum of the signal to be analyzed when the reference load is connected, and from a second measured spectrum of the signal to be analyzed when the reference load is not connected; and
 wherein a load switch is employed for connecting a reference load to the signal analyzer, and wherein the load switch is either integrated in an antenna, or the load switch is connected to the antenna via a first signal path and to the signal analyzer via a second signal path, wherein the first signal path is shorter than the second signal path.

9. The method according to claim 8, further comprising: controlling the load switch with the aid of the signal analyzer.

10. The method according to claim 8, wherein the first signal path comprises at least one first auxiliary measurement device.

11. The method according to claim 10, wherein the at least one first auxiliary measurement device comprises one or more of cabling, one or more filters, and one or more amplifiers.

12. The method according to claim 8, wherein the second signal path comprises at least one second auxiliary measurement device.

13. The method according to claim 12, wherein the at least one second auxiliary measurement device comprises one or more of cabling, one or more filters, and one or more amplifiers.

14. The method according to claim 8, wherein the signal to be analyzed is analyzed with respect to spectrum of the signal to be analyzed, wherein the reference load either is connected or is disconnected.

* * * * *